(12) United States Patent
Wipfler et al.

(10) Patent No.: US 9,692,035 B2
(45) Date of Patent: Jun. 27, 2017

(54) BATTERY SYSTEM AND MOTOR VEHICLE

(71) Applicants: Robert Bosch GmbH, Stuttgart (DE); Samsung SDI Co., Ltd., Yongin-si, Gyeonggi-do (KR)

(72) Inventors: Klaus Wipfler, Niefern-Oeschelbronn (DE); Markus Kohlberger, Stuttgart (DE); Joachim Fetzer, Bad-Ditzenbach (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 154 days.

(21) Appl. No.: 14/364,327

(22) PCT Filed: Nov. 15, 2012

(86) PCT No.: PCT/EP2012/072670
§ 371 (c)(1),
(2) Date: Jun. 11, 2014

(87) PCT Pub. No.: WO2013/087337
PCT Pub. Date: Jun. 20, 2013

(65) Prior Publication Data
US 2014/0322569 A1    Oct. 30, 2014

(30) Foreign Application Priority Data
Dec. 13, 2011  (DE) .................. 10 2011 088 328

(51) Int. Cl.
*H01M 2/34*  (2006.01)
*B60L 3/00*  (2006.01)
(Continued)

(52) U.S. Cl.
CPC ............. *H01M 2/34* (2013.01); *B60L 3/0046* (2013.01); *B60L 11/1864* (2013.01);
(Continued)

(58) Field of Classification Search
CPC ..................................................... H01M 2/34
See application file for complete search history.

(56) References Cited

U.S. PATENT DOCUMENTS

| | | | | |
|---|---|---|---|---|
| 5,238,083 A | * | 8/1993 | Horie | B60L 3/0007 180/274 |
| 5,496,654 A | * | 3/1996 | Perkins | H01M 10/46 429/1 |

(Continued)

FOREIGN PATENT DOCUMENTS

| | | |
|---|---|---|
| DE | 41 39 469 A1 | 6/1992 |
| DE | 42 34 551 C1 | 1/1994 |

(Continued)

OTHER PUBLICATIONS

International Search Report corresponding to PCT Application No. PCT/EP2012/072670, mailed Jan. 28, 2013 (German and English language document) (5 pages).

*Primary Examiner* — Sarah A Slifka
*Assistant Examiner* — Wojciech Haske
(74) *Attorney, Agent, or Firm* — Maginot, Moore & Beck LLP

(57) ABSTRACT

A battery system comprises a battery which includes a plurality of battery cells connected in series and two battery poles. The battery system further comprises at least one protection device, which is connected to the battery cells in series in such a manner that after the at least one protection device is tripped, a sum of voltages of the battery cells still connected in series does not exceed a limit voltage. The battery system also comprises a switching device which electrically connects the two battery poles, the switching device being configured to short-circuit the battery when a fault signal is detected, thus tripping the at least one protection device.

9 Claims, 2 Drawing Sheets

(51) Int. Cl.
   *H01M 10/48*   (2006.01)
   *B60L 11/18*   (2006.01)
(52) U.S. Cl.
   CPC ....... *B60L 11/1877* (2013.01); *H01M 10/482* (2013.01); *Y02T 10/7005* (2013.01); *Y02T 10/7061* (2013.01)

(56) References Cited

U.S. PATENT DOCUMENTS

| | | | | |
|---|---|---|---|---|
| 5,760,488 A | * | 6/1998 | Sonntag | B60L 3/0069 180/65.1 |
| 7,447,306 B1 | * | 11/2008 | Barth | G08B 26/005 379/399.01 |
| 2007/0188147 A1 | * | 8/2007 | Straubel | H01M 2/202 320/134 |
| 2014/0055899 A1 | * | 2/2014 | Gruber | H02H 3/08 361/91.6 |

FOREIGN PATENT DOCUMENTS

| | | | |
|---|---|---|---|
| DE | 197 12 544 A1 | 11/1997 | |
| DE | 10 2009 050 996 A1 | 5/2011 | |
| DE | 102010045904 | * 5/2011 | ............. H01M 2/34 |
| DE | 10 2010 049 611 A1 | 6/2011 | |
| EP | 2 357 685 A1 | 8/2011 | |
| JP | 4-208007 A | 7/1992 | |
| JP | 2004-319463 A | 11/2004 | |

* cited by examiner

BATTERY SYSTEM AND MOTOR VEHICLE

This application is a 35 U.S.C. §371 National Stage Application of PCT/EP2012/072670, filed on Nov. 15, 2012, which claims the benefit of priority to Ser. No. DE 10 2011 088 328.2, filed on Dec. 13, 2011 in Germany, the disclosures of which are incorporated herein by reference in their entirety.

The present disclosure relates to a battery system which comprises a battery having a plurality of battery cells which are connected in series. The disclosure also relates to a motor vehicle which comprises the battery system.

BACKGROUND

In vehicles which are at least partially electrically driven, electrical energy stores are used in order to store the electrical energy for the electric motor which assists the drive or serves for driving. In latest-generation vehicles, what are known as lithium-ion batteries are used for this purpose. Lithium-ion batteries are distinguished, amongst other things, by high energy densities and an extremely low level of self-discharging. Lithium-ion battery cells have at least a positive and a negative electrode (cathode and, respectively, anode), these electrodes being able to reversibly insert (intercalation) or extract (deintercalation) lithium ions (Li+).

FIG. 1 shows how individual battery cells 10 can be combined to form battery modules 12 and then to form batteries 14. This is performed by connecting the poles of the battery cells 10 in parallel or in series (not illustrated). In this case, a battery module 12 or a battery 14 comprises, by definition, at least two battery cells 10, wherein the terms battery 14 and battery module 12 are often used synonymously. The electrical voltage of a battery 14 is, for example, between 120 and 600 volts DC.

Various influences can influence the service life or the reliability of a lithium-ion battery. Said influences include, firstly, electrical influences such as excessively high currents or voltages, temperature influences, and also mechanical influences. Battery cells of which the housings are composed of a solid aluminum or steel sheet are inherently dimensionally stable and withstand relatively small knocks without mechanical deformation. However in the event of the battery-operated vehicle being involved in an accident, the housing of the battery and therefore of the battery cells may also be permanently and considerably deformed. In this situation, there is a risk of, for example, parts of the vehicle body coming into contact with a battery pole and therefore endangering occupants and rescue personnel.

DE 10 2009 050 996 A1 discloses an apparatus and a method for severing the connection lines between at least two energy sources (for example battery cells) within an energy storage device (for example a battery). The lines are severed by a propellant which is discharged, for example, after the evaluation of a crash signal. Severing the lines within the battery interrupts the internal flow of current, as a result of which the battery can no longer be short-circuited from the outside.

U.S. Pat. No. 5,760,488 A is concerned with providing a vehicle with a fuel cell—or battery-fed energy supply system. Said vehicle is equipped with an insulation monitoring means for protecting against high contact voltages.

SUMMARY

The disclosure provides a battery system having a battery which comprises a plurality of battery cells which are connected in series. The battery additionally comprises at least one protection means, which may be provided as a protection device, a protection structure, or a protection assembly, which is connected in series with the battery cells in such a way that, after the at least one protection means is tripped, the sum of the voltages of the battery cells which are still connected in series does not exceed a limit voltage. The battery system further comprises a switching means, which may be provided as a switching device, a switching structure, or a switching assembly, which electrically connects the two battery poles and is designed to short-circuit the battery when an interference signal is identified, so that the at least one protection means is tripped.

The disclosure is based on the finding that the series connection of the battery cells is at least partially broken by deliberately short-circuiting the battery since one or more protection means, which are in turn connected in series with the battery cells, are tripped. Tripping of a plurality of protection means which are connected in series is made possible by the protection means having only very small manufacturing tolerances and as a result being tripped at virtually the same time. This allows all of the protection means which are connected in series to be reliably tripped. In order for this to be possible, the switching means is open during interference-free operation and designed to close in the event of an interference signal and therefore to short-circuit the battery. However, it should be noted that a new series connection of battery cells can be produced by means of the switching means as a result of the switching means being closed. As a result, the voltages of the battery cells which are connected to the positive battery pole and to the negative battery pole are again summed. If this voltage is higher than a maximum permissible voltage, the switching means can, for example, be opened again after the fuse is tripped, or a further protection means can be arranged between the switching means and one of the nearest battery cells.

The battery according to the disclosure has the advantage that, when relevant interference is identified, the maximum existing voltage within the battery is limited to a tolerable value. This is expedient, for example, in the event of insulation damage, which is caused by mechanical deformation in the event of a road traffic accident amongst other things, in order to minimize the danger to occupants or rescue personnel from a possible electric shock.

The maximum voltage occurring within the battery is preferably less than 60 volts DC voltage after the fuse is tripped. Fatal injuries due to electrocution can be largely precluded at contact voltages of less than 60 volts DC voltage. Contact protection can be dispensed with at an even lower limit voltage on account of the only low remaining voltage; a protective cover which has been damaged, for example, in the event of an accident no longer constitutes a safety risk. The risk of electric shocks during subsequent repair operations is also reduced.

A plurality of battery cells can also be combined to form battery modules which, in turn, are connected in series in order to increase the voltage. A battery module can have, for example, a contact voltage which is still permissible, but two battery modules which are connected in series exceed this permissible contact voltage. Therefore, the battery can be protected in a simple manner by way of connecting in each case one protection means in series with each battery module or between each pair of battery modules which are connected in series.

According to a preferred refinement of the disclosure, the at least one protection means is a fuse which constitutes a particularly cost-effective alternative.

The at least one protection means is further preferably a semiconductor fuse, as a result of which a short response time can be realized together with a relatively low space requirement.

The at least one protection means is furthermore preferably a resetting fuse. Said resetting fuse can be either a manually resetting fuse or a self-resetting fuse, wherein, for example, a PTC thermistor element can be used as the self-resetting fuse.

The switching means is preferably a relay, or further preferably a contactor, in order to be able to realize, for example, relatively high switching capacities.

According to a preferred refinement, the battery comprises an impact sensor which is connected to the switching means for the direct or indirect transmission of the interference signal. Impact sensors of this kind are also used, amongst other things, for tripping an airbag. For example, given a specific accident severity in the event of which severe deformation of the vehicle body is to be expected, the battery is short-circuited and the at least one protection means is tripped.

One possible way of detecting an interference situation which is independent of an accident is in the preferred use of a battery which comprises an insulation monitor. Said insulation monitor is, in turn, connected to the switching means for the direct or indirect transmission of the interference signal. As a result, the at least one protection means is tripped only after an actual insulation fault is detected. Optionally, the protection means can also interrupt the series circuit only after a double insulation error, that is to say when there are two points with defective insulation, and also when there is a combination of interference signals from an insulation monitor and an impact sensor.

The at least one protection means is furthermore preferably an integral constituent part of a circuit which is permanently bound to the battery cell. This circuit can further preferably be arranged within the battery cell. As a result, the protection means is additionally protected against environmental influences by the battery cell housing.

The battery is preferably a lithium-ion battery. The use of lithium-ion technology can result in particularly high energy storage densities, this leading to further advantages, particularly in the field of electromobility.

The disclosure further provides a motor vehicle which comprises the battery according to the disclosure. The battery is generally intended to feed an electrical drive system of the vehicle.

The motor vehicle preferably further comprises an impact sensor which is connected to the switching means for the direct or indirect transmission of the interference signal. By virtue of this refinement, an impact sensor which is present in the vehicle in any case can be used to generate the interference signal.

Advantageous developments of the disclosure are specified in the dependent claims and can be found in the description.

BRIEF DESCRIPTION OF THE DRAWINGS

Exemplary embodiments of the disclosure will be explained in greater detail with reference to the drawings and the following description. In the drawings.

DETAILED DESCRIPTION

Figure 1:
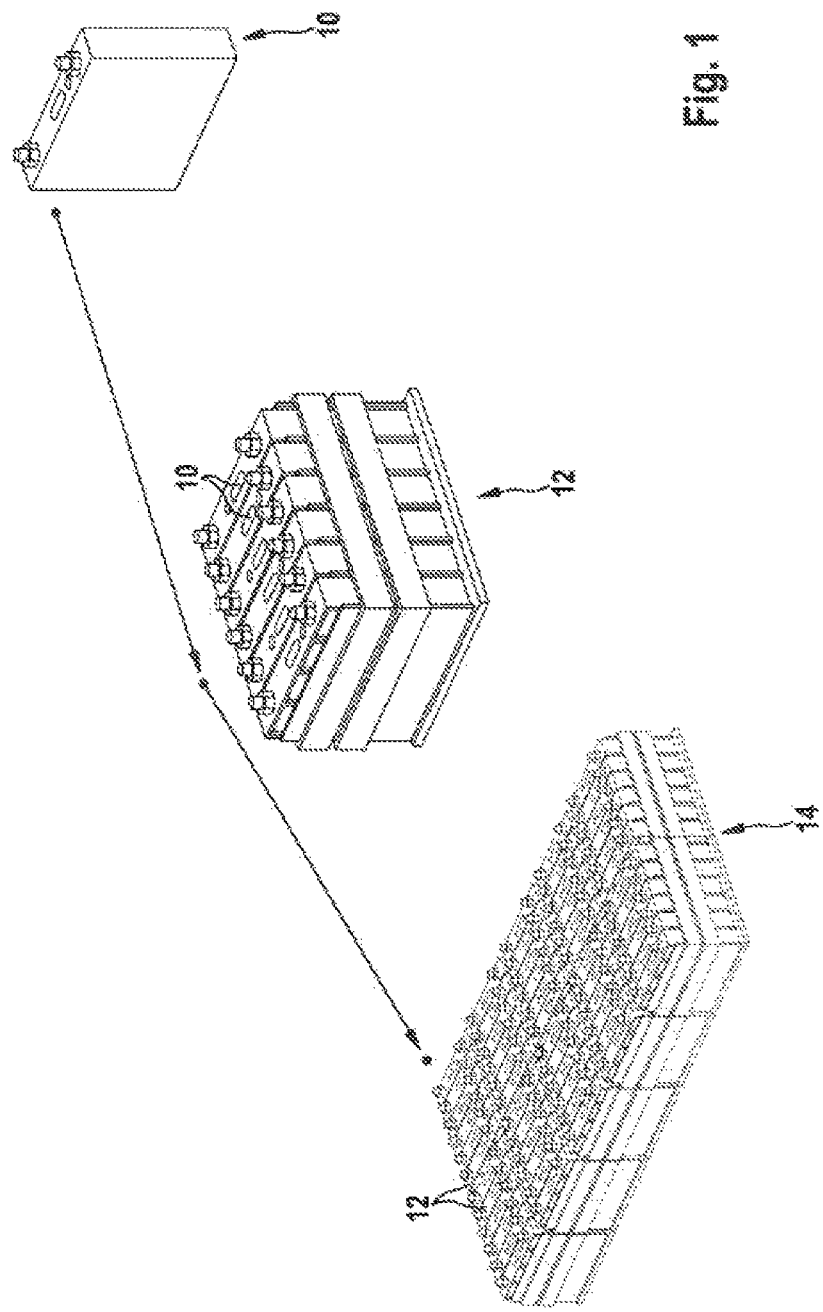
FIG. 1 shows a battery cell, a module and a battery.

FIG. 1 has already been discussed to explain the prior art.

Figure 2:
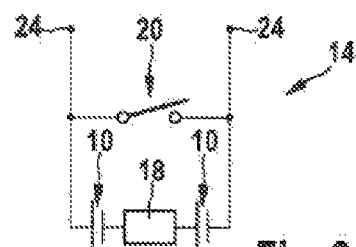
FIG. 2 shows a battery according to the disclosure.

FIG. 2 shows a circuit diagram of a battery system according to the disclosure, wherein, in the simplest case, the battery 14 comprises only two battery cells 10 which are connected in series. The two battery cells 10 are connected in series by means of an interposed protection means 18, for example a relay, and the two battery poles 24 are electrically connected to one another by way of a switching means 20. The switching means 20 can, for example, be part of the battery 14 and be integrated into said battery.

During interference-free operation, the switching means 20 is open; a load (not illustrated), for example a drive motor of an electric vehicle, which is connected to the battery poles 24 is supplied with power by the battery 14. If an interference signal is detected in the event of interference, the switching means 20 is closed and therefore the battery 14 is short-circuited. On account of the high short-circuit current which is produced, the protection means 18 is tripped and therefore the series connection of the two battery cells 10 is interrupted. However, a new series connection between the two battery cells 10 is created by means of the switching means 20 when the switching means 20 is closed. The sum of the voltages of the two battery cells 10 is now not applied between the battery poles 24, but rather within the battery 14 between the two ends of the tripped protection means 18. In the event of a possible insulation fault in the battery housing 16, this can lead to a new hazardous situation. In order to break this series connection by means of the switching means 20, the switching means 20 can, for example, be opened again after the protection means 18 is tripped. Another possible way is to arrange a further protection element between one of the battery poles 24 and the battery cell 10 which is directly interconnected with said battery pole. As a result of electrical division of the battery cells 10, the voltages of said battery cells are no longer summed by a series connection, as a result of which a possible source of danger is mitigated.

Figure 3:
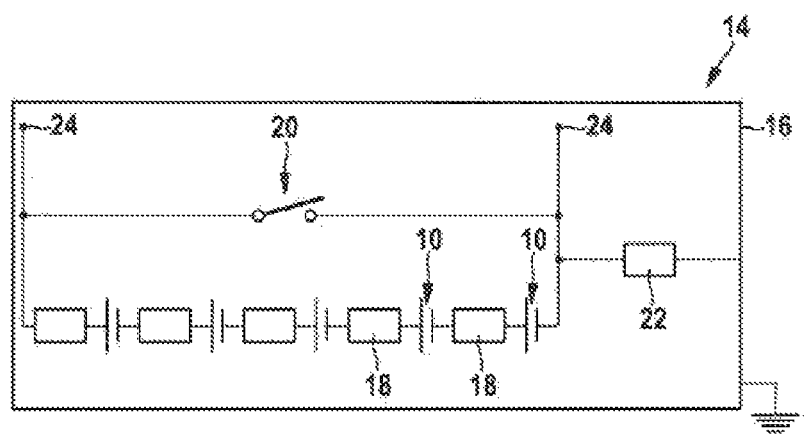
FIG. 3 shows a battery according to the disclosure with an insulation monitor.

FIG. 3 shows a preferred refinement of the disclosure, according to which a protection means 18 is associated with each battery cell 10. To this end, each protection means 18 can be, for example, an integral constituent part of a circuit which is permanently bound to the battery cell 10. In addition, the battery 14 comprises an insulation monitor 22 which is designed to detect contact of the battery housing 16 with a part of the battery 14 to which voltage is applied. If the insulation monitor 22 now detects an insulation fault in relation to the battery housing 16, the normally open switching means 20 is closed and therefore the battery 14 is short-circuited. When the switch 20 is closed, all of the protection means 18 are tripped at virtually the same time. This is possible since the protection means 18 are subject to very narrow tolerances, and therefore said protection means are tripped at virtually the same point in time. After the protection means 18 are tripped, the maximum voltage which occurs within the battery 14 corresponds to the voltage of an individual battery cell 10.

When the voltages of individual battery cells 10 are only low, it is usually economical to not associate a protection means 18 with each battery cell 10, but rather to arrange a protection means 18 only after a specific number of battery cells 10 which are connected in series. The number of battery cells 10 which are connected in series until a protection means 18 is connected in series depends on the voltage of the individual battery cells 10 and on a maximum permissible limit voltage in the event of interference.

Figure 4:
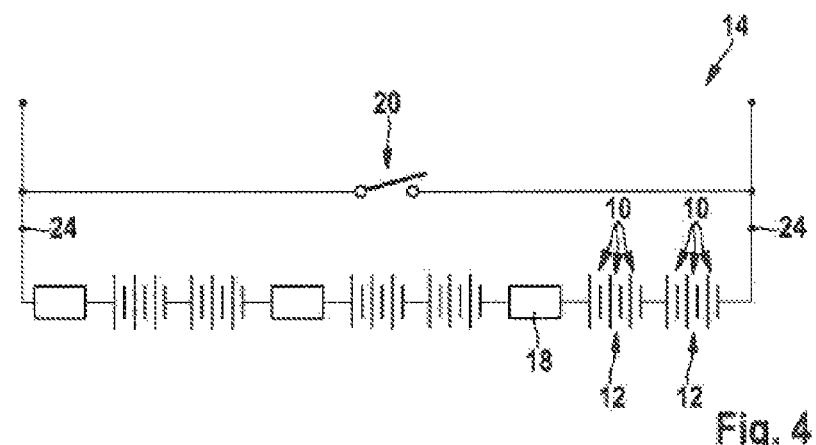
FIG. 4 shows a battery according to the disclosure comprising battery modules.

For example, as depicted in FIG. 4, in each case three battery cells 10 can be interconnected in series to form a battery module 12. The switching means 20 can also, as depicted, be arranged outside the battery 14, and connects the battery poles 24 by means of the connection terminals of the battery 14. When a battery cell 10 has an individual voltage of 9 volts, this therefore produces the voltage of a battery module 12 of 27 volts. If the prespecified limit voltage is less than 60 volts, a maximum of two battery modules 12 can remain connected in series after the protection means 18 are tripped, and therefore the sum of the voltages of the battery modules 12 which are connected in series is less than 60 volts. Accordingly, a protection means 18 is arranged after in each case two battery modules 12. When the switching means 20 is closed and after the protection means 18 are tripped, the voltage of the remaining series circuits of the battery modules 12 is therefore 54 volts in each case.

The invention claimed is:

1. A battery system comprising:
   a battery including a plurality of battery cells and two battery poles, the plurality of battery cells being connected in series between the two battery poles;
   a battery housing configured to house the plurality of battery cells of the battery;
   at least one protection device connected between battery cells of the plurality of battery cells such that, after the at least one protection device is tripped, the plurality of battery cells are electrically separated into at least two series connected groups, each group having a combined voltage that does not exceed a limit voltage;
   a switching device connected between the two battery poles of the battery and configured to close to short-circuit the battery and trip the at least one protection device in response to an interference signal; and
   an insulation monitor connected between the battery and the battery housing, the insulation monitor configured to detect an insulation fault between the battery and the battery housing and operate the switching device to close by providing the interference signal to the switching device in response to detecting the insulation fault.

2. The battery system as claimed in claim 1, wherein the at least one protection device is an integral constituent part of a circuit which is permanently bound to the plurality of battery cells.

3. The battery system as claimed in claim 1, wherein the at least one protection device includes at least one of a fuse, a semiconductor fuse, and a resetting fuse.

4. The battery system as claimed in claim 3, wherein the resetting fuse is a self-resetting fuse.

5. The battery system as claimed in claim 1, wherein the switching device includes at least one of a relay, and a contactor.

6. The battery system as claimed in claim 1, wherein the limit voltage is less than 60 volts DC voltage.

7. The battery system as claimed in claim 1, further comprising:
   an impact sensor connected to the switching device, the impact sensor configured to detect an impact and operate the switching device to close by providing the interference signal to the switching device in response to detecting the impact.

8. A motor vehicle comprising:
   a battery system including (i) a battery having a plurality of battery cells and two battery poles, the plurality of battery cells being connected in series between the two battery poles, (ii) a battery housing configured to house the plurality of battery cells of the battery, (iii) at least one protection device connected between battery cells of the plurality of battery cells such that, after the at least one protection device is tripped, the plurality of battery cells are electrically separated into at least two series connected groups, each group having a combined voltage that does not exceed a limit voltage, (iv) a switching device connected between the two battery poles of the battery and configured to close to short-circuit the battery and trip the at least one protection device in response to an interference signal, and (v) an insulation monitor connected between the battery and the battery housing, the insulation monitor configured to detect an insulation fault between the battery and the battery housing and operate the switching device to close by providing the interference signal to the switching device in response to detecting the insulation fault.

9. The motor vehicle as claimed in claim 8, further comprising:
   an impact sensor connected to the switching device, the impact sensor configured to detect an impact and operate the switching device to close by providing the interference signal to the switching device in response to detecting the impact.

* * * * *